(12) United States Patent
Mohamed et al.

(10) Patent No.: US 12,270,348 B2
(45) Date of Patent: Apr. 8, 2025

(54) SEALING DEVICE FOR A DISCHARGE VALVE OF A TURBOMACHINE

(71) Applicant: SAFRAN AIRCRAFT ENGINES, Paris (FR)

(72) Inventors: Azath Mohamed, Moissy-Cramayel (FR); Alexandre Branco, Moissy-Cramayel (FR); Thierry Georges Paul Papin, Moissy-Cramayel (FR); Virginie Martine Collin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/275,210

(22) PCT Filed: Jan. 21, 2022

(86) PCT No.: PCT/FR2022/050120
§ 371 (c)(1),
(2) Date: Jul. 31, 2023

(87) PCT Pub. No.: WO2022/167742
PCT Pub. Date: Aug. 11, 2022

(65) Prior Publication Data
US 2024/0102422 A1    Mar. 28, 2024

(30) Foreign Application Priority Data
Feb. 3, 2021 (FR) ...................................... 2101024

(51) Int. Cl.
*F02C 9/18* (2006.01)
*F02C 7/28* (2006.01)
(Continued)

(52) U.S. Cl.
CPC .................. *F02C 9/18* (2013.01); *F02C 7/28* (2013.01); *F04D 27/0215* (2013.01); *F16K 3/10* (2013.01);
(Continued)

(58) Field of Classification Search
CPC .......... F16K 3/10; F16K 31/52; F16K 31/521; F16K 31/5282; F02C 9/18; F02C 6/08;
(Continued)

(56) References Cited

U.S. PATENT DOCUMENTS 3,638,428 A * 2/1972 Shipley .................. F02K 3/075
                                                    415/149.1
5,044,153 A    9/1991 Mouton
(Continued)

FOREIGN PATENT DOCUMENTS

| EP | 0374004 A1 | 6/1990 |
| FR | 3089270 A1 | 6/2020 |
| FR | 3096083 A1 | 11/2020 |

OTHER PUBLICATIONS

International Preliminary Report on Patentability received for PCT Patent Application No. PCT/FR2022/050120, mailed on Aug. 17, 2023, 12 pages (6 pages of English Translation and 6 pages of Original Document).
(Continued)

*Primary Examiner* — Michael K. Reitz
(74) *Attorney, Agent, or Firm* — WOMBLE BOND DICKINSON (US) LLP

(57) ABSTRACT

Discharge valve of an aircraft turbomachine, including a discharge gate intended to be mounted pivotably about an axis between a position for closing an air passage orifice and an open position of said orifice, the orifice being formed in an intermediate casing of the turbomachine, the discharge valve including a sealing device having a seal configured to
(Continued)

be movably mounted on the intermediate casing and a movement system configured to move the seal between a first position in which the seal is intended to bear against the discharge gate when the gate is in a closure position, and a second position in which the seal is retracted with respect to the air passage orifice when the discharge gate is in an open position.

5 Claims, 2 Drawing Sheets

(51) Int. Cl.
  *F04D 27/02* (2006.01)
  *F16K 3/10* (2006.01)
(52) U.S. Cl.
  CPC ...... *F05D 2220/36* (2013.01); *F05D 2240/14* (2013.01)
(58) Field of Classification Search
  CPC .. F04D 27/0215; F04D 27/023; F04D 27/009; F05D 2240/55
  See application file for complete search history.

(56) References Cited

U.S. PATENT DOCUMENTS

| | | | | |
|---|---|---|---|---|
| 5,048,286 | A * | 9/1991 | Stransky | F02C 9/18 60/226.3 |
| 5,279,109 | A * | 1/1994 | Liu | F02K 3/075 60/785 |
| 6,672,327 | B1 * | 1/2004 | Krywitsky | F16K 31/52 251/89.5 |
| 2004/0227121 | A1 * | 11/2004 | Kassulat | B08B 3/026 251/231 |
| 2020/0229651 | A1 | 7/2020 | Ellen | |
| 2021/0222587 | A1 * | 7/2021 | Cerino | F01D 25/24 |
| 2022/0003168 | A1 | 1/2022 | Tessiereau et al. | |

OTHER PUBLICATIONS

International Search Report and Written Opinion received for PCT Patent Application No. PCT/FR2022/050120, mailed on May 16, 2022, 15 pages (6 pages of English Translation and 9 pages of Original Document).

* cited by examiner

SEALING DEVICE FOR A DISCHARGE VALVE OF A TURBOMACHINE

TECHNICAL FIELD OF THE INVENTION

The field of the invention is that of discharge valves for turbomachine casings, and in particular for turbomachine intermediate casings.

The present invention relates more particularly to a sealing device for a turbomachine discharge valve, and to a turbomachine valve comprising such a sealing device.

TECHNICAL BACKGROUND

The technical background includes in particular the documents EP 0 374 004 A1, FR 3 096 083 A1 and FR 3 089 270 A1.

In a turbomachine, discharge valves, also known by their acronym VBV for Variable Bleed Valve, are generally mounted on the hub of an intermediate casing of a dual-flow turbomachine, positioned between the low-pressure compressor and the high-pressure compressor. The discharge valves are positioned in an intervein annular space of the hub of the intermediate casing extending between a main flow duct (primary duct) in which a primary air flux flows and a secondary flow duct (secondary duct) in which a secondary air flux flows.

They are then opened and closed to regulate the air leakage rate according to the operating conditions of the turbomachine, for example to prevent pumping.

These discharge valves are evenly distributed on the hub of the intermediate casing around the longitudinal axis of the turbomachine and each comprise a gate mounted so as to pivot around an axis, so as to be angularly moveable with respect to the intermediate casing, between a closing position in which the gate closes an air passage orifice formed in the hub of the intermediate casing and a position in which this orifice is open.

A control annulus is positioned outside the duct between the casing of the compressor and an external cover of the turbomachine, and controls the opening and closing of the discharge gates. The rotation of this actuates lever-actuating devices that drive the discharge gates.

The discharge valves ensure a seal between the primary duct and the secondary duct in their closing position and allow part of the primary air flux to be discharged from the primary duct under certain operating conditions in their open position. The extracted part of the primary air flux is either re-injected into the secondary air flux, or used to supply cooling systems or to ventilate components of the turbomachine.

To ensure the seal between the primary duct and the secondary duct in the closed position of the discharge gates, the wall of the intermediate casing bordering the air passage orifice has a seal, for example made of elastomer, extending around the periphery of the wall bordering the orifice. In the closed position of the discharge valve, the seal is designed to rest against the peripheral edges of each gate.

However, in the open position of the discharge gate, the seal is no longer in compression against the discharge gate. As a result, it extends into the air flux, which can lead to a reduction in the cross-sectional area of the aerodynamic flux of scooped air. One solution to this problem would be to increase the opening of the gate of the discharge valve. However, the opening angle of the gate is very limited and cannot compensate for this loss in scooped air flux.

In this context, the invention aims to provide a solution to overcome these disadvantages.

SUMMARY OF THE INVENTION

To this end, the invention relates to a discharge valve for an aircraft turbomachine, comprising a discharge gate intended to be mounted so as to pivot about an axis between a position for closing an air passage orifice and an open position of said orifice, the orifice being provided in an intermediate casing of the turbomachine, the discharge valve comprising a sealing device comprising:
  a seal configured to be movably mounted on the intermediate casing, and
  a movement system configured to move the seal between a first position in which the seal is intended to bear against the discharge gate when the gate is in the closing position and a second position in which the seal is retracted with respect to the air passage orifice when the gate is in the open position.

Thus, this solution allows to achieve the above-mentioned objective. In particular, the invention allows to ensure a seal between the intermediate casing and the gate of a discharge valve in the closed position, while avoiding obstruction of the aerodynamic air flux when the gate is in the open position.

Thanks to the invention, the seal is advantageously stowed or retracted when the discharge gate is in the open position, thus preventing it from extending into the air flux when the seal is no longer compressed against the gate. In this way, the entire cross-sectional area for the aerodynamic flux of air between the discharge gate and the intermediate casing is preserved without being penalised by the volume occupied by the seal.

The discharge valve according to the invention may also have one or more of the following characteristics, considered individually or in any technically possible combination:
  the movement system is controlled, preferably mechanically, by the opening or closing of the discharge gate;
  the movement system comprises a seal support configured to be slidably mounted in a cavity provided in the intermediate casing opening into the air passage orifice and an actuator configured to move the seal from the first position to the second position when actuated by the opening of the discharge gate and from the second position to the first position when actuated by the closing of the discharge gate, the seal being housed in the cavity of the intermediate casing in the second position;
  the movement system comprises a connecting rod configured to be mounted so as to pivot about an axis in the cavity of the intermediate casing, the connecting rod being articulated at one end on an axis secured to the support of the seal and controlled at the other end by the action of a spring forming an actuator, the spring being configured to return the connecting rod to a position in which the seal is held in the second position when the discharge gate is in the open position and to be compressed by the discharge gate when it is in the closing position so as to pivot the connecting rod into a position in which the seal is held in the first position;
  the sealing device comprises a stop configured to be fixed to the discharge gate so as to compress the spring when the gate is in the closing position;
  the discharge gate is configured to project radially inwards from the intermediate casing in the open position defining a scooping volume and the stop is intended to be fixed to the discharge gate outside said scooping volume.

Another object of the invention relates to a turbomachine intermediate casing comprising a plurality of discharge valves according to the invention ensuring sealing at the level of a plurality of air passage orifices.

The invention also relates to a turbomachine comprising a low-pressure compressor, a high-pressure compressor and an intermediate casing as described above and positioned longitudinally between the low-pressure compressor and the high-pressure compressor.

BRIEF DESCRIPTION OF THE FIGURES

The invention will be better understood and other details, characteristics and advantages of the present invention will become clearer from the following description made by way of non-limiting example and with reference to the attached drawings, in which.

In the various figures, the similar elements are designated by identical references. In addition, the various elements are not necessarily shown to scale in order to present a view allowing to facilitate the understanding of the invention.

DESCRIPTION OF THE EMBODIMENTS

A sealing device to which the invention is addressed is, for example, installed in an aircraft turbomachine, in particular a dual-flow turbomachine, comprising a low-pressure compressor.

Figure 1:
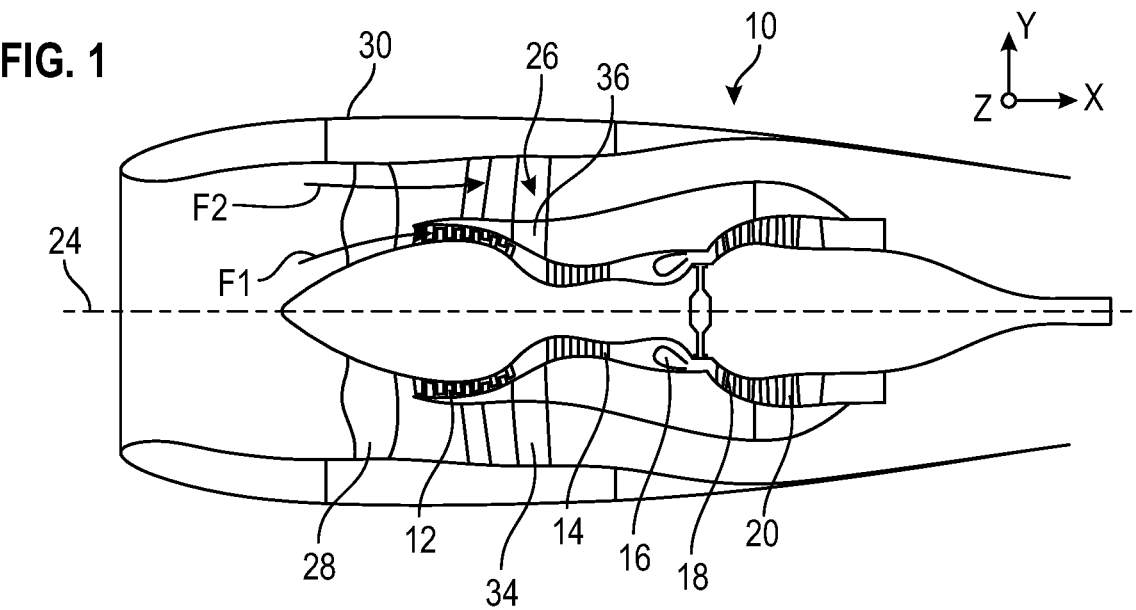
FIG. 1 illustrates schematically, in axial section, a dual-flow turbomachine to which the invention applies.

In the present invention, and in general, the terms "upstream", "downstream", "axial" and "axially" are defined with respect to the circulation of the gases in the turbomachine and here along the longitudinal axis X (and even from left to right in FIG. 1). Similarly, the terms "radial", "internal" and "external" are defined in relation to a radial axis Y perpendicular to the longitudinal axis X and in relation to the distance from the longitudinal axis X.

As shown in FIG. 1, which is a schematic axial cross-sectional view of a dual-flow turbomachine or double body 10, such a turbomachine generally comprises, from upstream to downstream in the direction of gas flow, a low-pressure compressor 12, a high-pressure compressor 14, a combustion chamber 16, a high-pressure turbine 18 and a low-pressure turbine 20, which define a flow duct for a primary gas flux F1.

The high-pressure turbine 18 is secured to the high-pressure compressor 14 so as to form a high-pressure body, while the low-pressure turbine 20 is secured to the low-pressure compressor 12 so as to form a low-pressure body, so that each turbine drives the associated compressor in rotation about the longitudinal axis 24 of the turbomachine under the effect of the thrust of the gases coming from the combustion chamber 16.

In such a turbomachine 10, an intermediate casing 26 is usually interposed between the low-pressure compressor 12, located upstream, and the high-pressure compressor 14, located downstream. The intermediate casing 26 is generally cylindrical or frustoconical in shape.

In the case of dual-flow turbomachines, which comprise a fan 28 ducted by a nacelle 30 to generate a secondary flux F2, the intermediate casing 26 generally comprises arms 34 passing through the flow duct of this secondary flux 32.

Figure 2:
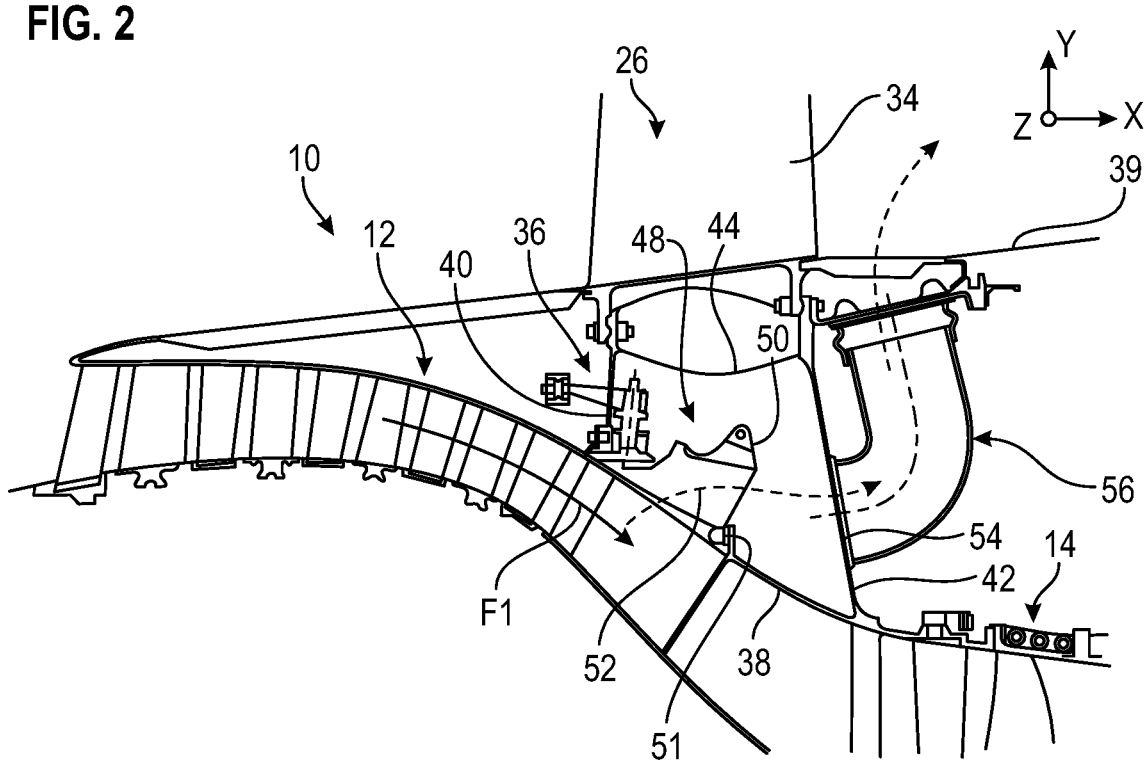
FIG. 2 is a simplified cross-sectional view of an intermediate casing of the turbomachine of FIG. 1.

FIG. 2 shows a simplified view of an intermediate casing 26 on which discharge valves 48 are mounted at the hub 36 of the intermediate casing 26. This hub 36 comprises two coaxial annular shells, an internal ring 38 and an external ring 44, respectively, and two radial walls or flanges, an upstream wall 40 and a downstream wall 42 respectively, connecting the internal 38 and the external 44 shells. The internal shell 38 delimits the external part, with respect to the axis 24, of the primary flow space, or primary duct, of the primary flux F1 of the turbomachine.

This hub 36 is also fitted with an annular row of discharge valves 48, one of which can be seen in cross-section in FIG. 2. This figure shows more specifically the gate 50 of the valve 48, which is mounted so as to pivot about an axis 51, so as to be movable between a position for opening and a position for closing a corresponding orifice formed in the internal shell 38 of the hub 36.

Each of the discharge air inlet orifices 60, which are substantially parallelepipedic in shape, is associated with a discharge valve 48 designed to regulate the flow rate of the high-pressure compressor 14.

Figure 3:
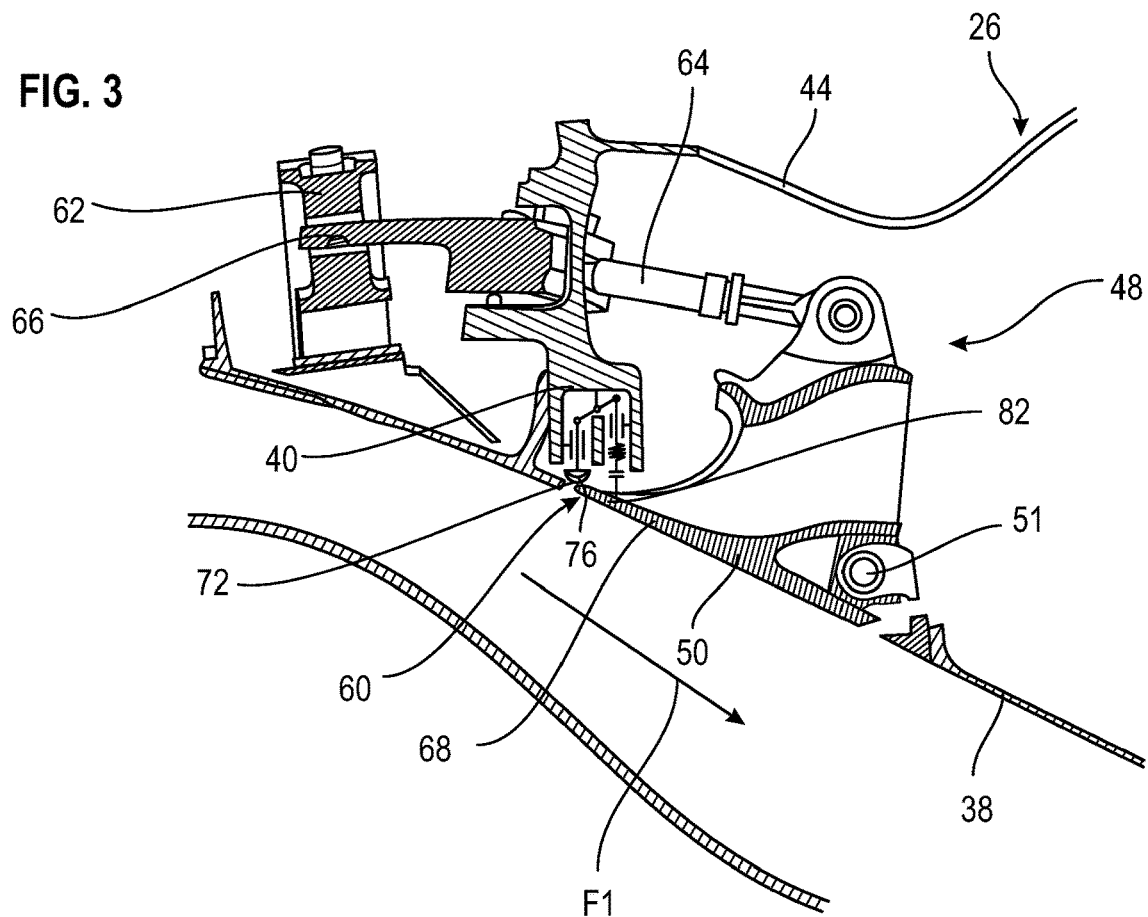
FIG. 3 is a simplified cross-sectional view of a portion of a turbomachine discharge valve illustrating the behaviour of the seal according to the invention in the closed position of the discharge gate.

A device for controlling the opening and closing of the discharge gates is more clearly visible in FIG. 3 and comprises a one-piece circular annulus 62 for controlling the opening or closing of the discharge gates as a function of the operating conditions of the turbomachine. This annulus 62 is centred on the longitudinal axis 24 of the turbomachine and placed in the space surrounding the casing 26. The rotation of the control annulus 62 is performed by actuators which are also located outside the casing 26. The rotation of the control annulus 62 activates lever actuating devices which drive the discharge gates 50. Thus, for each discharge gate 50, a lever actuating device 64 is fixed by a fastener 66 to the control annulus, so as to transform the rotational movement of the annulus 62 about the axis 24 of the casing into a movement for opening or closing the gate 50. The fastener 66 is designed to form a suitable connection between the control annulus 62 and the elements of the lever device 64. Here, there is a pivot connection about a substantially radial axis between the control annulus 62 and a bellcrank of the lever device 64.

The opening of each valve 48 causes an air flux (dotted arrow 52) to be discharged into the annular space delimited by the shells 38, 44 and the radial walls 40, 42.

The downstream radial wall 42 delimits the internal part, relative to the axis X, of the secondary flow space, secondary duct, of the secondary flux F2. It comprises an annular row of orifices 54 for the passage of the discharge air flux 52 downstream. As can be seen in FIG. 2, discharge conduits 56 are mounted downstream of the intermediate casing 26 and are each designed to guide a flux of air 52 caused by the opening of a discharge valve 48, the flux of air being guided from the outlet of the orifices 54 to the flow duct of the secondary flux F2.

FIG. 3 shows in more detail a portion of a discharge valve 48 of an intermediate casing 26 of a turbomachine 10 according to the invention.

Each discharge gate 50 has a substantially parallelepiped shape complementary to that of the corresponding discharge air inlet orifice 60. The function of the gate 50 is to ensure a seal between the primary flux F1 and the secondary flux F2 and to authorise a discharge flow rate between the primary flux F1 and the secondary flux F2 as a function of a programme for controlling the discharge valve 48.

The discharge gate 50 is configured to pivot about a transverse axis 51 which is substantially tangent to the intermediate casing 26 and which extends substantially along the downstream peripheral edge of the gate 50 in the examples shown in the figures.

The gate 50 can therefore be moved angularly by pivoting about the transverse axis 51 between a closed or closing position and an open position of this orifice 60.

In the closed position, the inner surface 68 of the gate 50 is aligned with the surface of the internal annular shell 38 of the intermediate casing 26.

Figure 4:
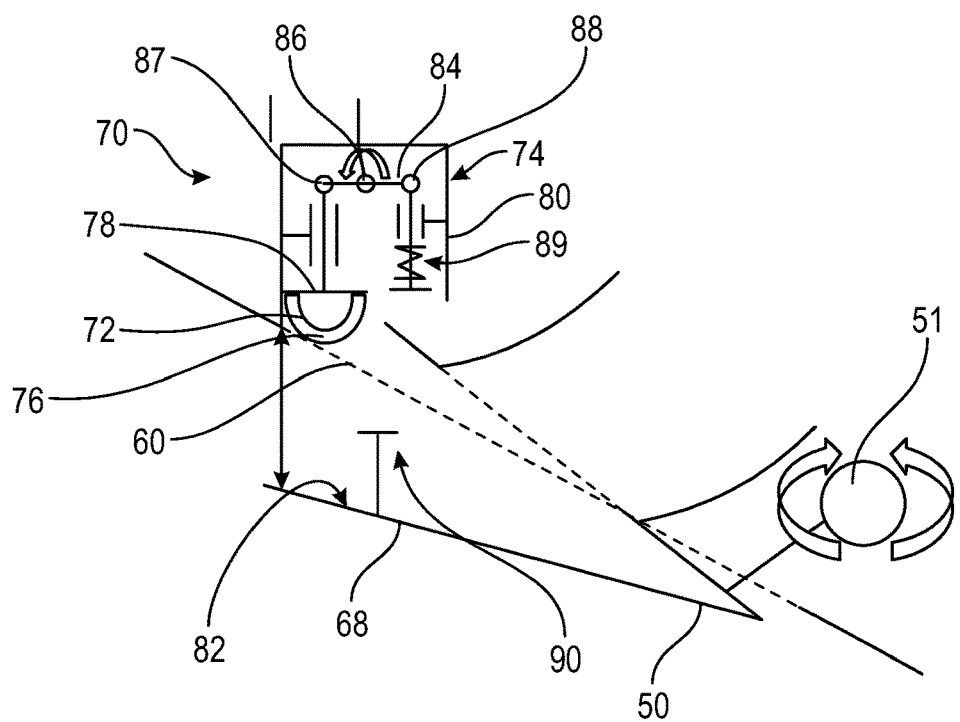
FIG. 4 shows a schematic cross-section of the portion of the turbomachine discharge valve shown in FIG. 3, illustrating the behaviour of the seal according to the invention when the discharge gate is open.

In the open position, the gate 50 is inclined at an angle of approximately 60° towards the inside of the intermediate casing 12 with respect to its closed position, as can be seen in FIG. 4. In this way, the discharge gate 50 is configured to project radially inwards from the intermediate casing 26 in the open position, defining a scooping volume.

In order to ensure that the primary duct is sealed in the closed position of the discharge gate 50, the latter comprises a sealing device 70 equipped with a seal 72 configured to be movably mounted on the intermediate casing 26 and a movement system 74 configured to move the seal 72 relative to the intermediate casing 26. In particular, the movement system 74 is configured to move the seal 72 between a first position, known as the extended position, in which the seal 72 bears against the discharge gate 50 when the gate is in the closed position, and a second position, known as the retracted position, in which the seal 72 is retracted relative to the air passage orifice 60 when the gate 50 is in the open position.

The seal 72 extends longitudinally in a transverse direction which is substantially tangential to the intermediate casing 26 and which extends substantially along the upstream peripheral edge of the discharge gate 50 so as to bear against it, in the closed position of the discharge gate illustrated in FIG. 3. Over its entire length, it has a bead or curved part 76 directed towards the inside of the intermediate casing 26 and intended to be compressed by the discharge gate 50 when the latter is in the closed position in order to guarantee the sealing of the discharge valve 48.

The movement system 74 is controlled, preferably mechanically, by the opening or closing of the discharge gate 50.

To this end, the movement system 74 comprises a joint support 78 shaped to match the joint 74 in order to support the entire joint. A flat face of the seal opposite the curved part 76 is held to the support 78 by adhesive bonding.

The support 78 is slidably mounted in a cavity 80 in the intermediate casing 26.

The cavity 80 extends longitudinally in a transverse direction which is substantially tangential to the intermediate casing 26 and extends substantially along the upstream peripheral edge of the air passage orifice 60 and also has a depth in a radial direction. The cavity 80 is thus shaped to house the seal 72 in the second position, i.e., when the gate is open. In addition, the cavity 80 is open at one end and opens into the air passage orifice 60 to allow the seal 72 to project radially into the passage orifice 60 to come to bear against an external surface 82 of the gate 50 when the latter is in the closed position.

The movement system 74 comprises a connecting rod 84 configured to be pivotally mounted about a transverse axis 86 substantially tangential to the intermediate casing 26 in the cavity 80. The connecting rod 84 is also articulated at one end on an axis 87 secured to the support 78 of the seal and controlled at the other end by an actuator.

The actuator is configured to move the seal 72 from the first extended position to the second retracted position when actuated by opening the discharge gate 50 and from the second retracted position to the first extended position when actuated by closing the discharge gate 50.

Preferably, the actuator is a spring 89 configured to return the connecting rod 84 into a position in which the seal 72 is held in the retracted position. The connecting rod 84 is thus articulated at the other end on a axis 88 secured to one end of the spring 89.

The spring 89 is further configured to be compressed by the discharge gate 50 when it is in the closed position so that the connecting rod is pivoted into a position in which the seal 72 is held in the first extended position.

The sealing device 70 advantageously comprises a stop 90 fixed to the discharge gate 50 and extending longitudinally in a radial direction so as to compress the spring 89 when the gate is in the closed position. In this way, it is the gate 50 itself which directly sets in motion the kinematics of the retractable seal 72. Preferably, the stop 90 is fixed to the discharge gate 72 outside the scooping volume in order to maximise the flux of air scooped by the discharge gate.

In operation, when the gate 50 of the discharge valve is closed, as shown in FIG. 3, the spring 89 is compressed by the discharge gate 50, preferably via the stop 90. In this way, the connecting rod 84 is held pivoted by the spring in a position such that the seal 72 is held in the first extended position, i.e., projecting radially into the passage orifice 60 and bearing against the external surface 82 of the gate 50, its curved part 76 being compressed.

When the gate 50 of the discharge valve opens (see FIG. 4), it no longer compresses the spring 89 which relaxes and thus causes the connecting rod 84 to pivot about the transverse axis 86 so as to slide the seal support 78 and thus retract the seal 72 into the cavity 80 outside the air passage orifice 60.

As a result, the seal no longer extends into the cross-sectional area for the aerodynamic flux of air, thus maximising the scooped air flux through the gate.

The invention as described above provides a compact solution that guarantees a seal between the intermediate casing and the gate of a discharge valve in the closed position, while preventing obstruction of the aerodynamic flux of air when the gate is in the open position.

The invention claimed is:

1. A discharge valve for an aircraft turbomachine comprising a discharge gate intended to be mounted to pivot about an axis between a position for closing an air passage orifice and an open position of said orifice, the orifice being provided in an intermediate casing of the turbomachine, the discharge valve comprising a sealing device comprising:
   a seal configured to be movably mounted on the intermediate casing; and
   a movement system configured to move the seal between a first position in which the seal is intended to bear against the discharge gate when the gate is in the closing position and a second position in which the seal is retracted with respect to the air passage orifice when the discharge gate is in the open position,
   wherein the movement system is controlled by the opening or closing of the discharge gate, wherein the movement system comprises a seal support configured to be slidably mounted in a cavity provided in the intermediate casing opening into the air passage orifice and an actuator configured to move the seal from the first position to the second position when actuated by the opening of the discharge gate and from the second position to the first position when actuated by the closing of the discharge gate, the seal being housed in the cavity of the intermediate casing in the second position, and wherein the movement system comprises a connecting rod configured to be mounted so as to pivot about an axis in the cavity of the intermediate casing the connecting rod being articulated at one end on an axis secured to the support of the seal and controlled at the other end by the action of a spring forming an actuator, the spring being configured to return the connecting rod to a position in which the seal is held in the second position when the discharge gate is in the open position and to be compressed by the discharge gate when it is in the closing position so as to pivot the connecting rod into a position in which the seal is held in the first position.

2. The discharge valve according to claim 1, comprising a stop configured to be fixed to the discharge gate so as to compress the spring when the discharge gate is in the closing position.

3. The discharge valve according to claim 2, wherein the discharge gate is configured to project radially towards the inside of the intermediate casing in the open position defining a scooping volume and the stop is intended to be fixed to the discharge gate outside said scooping volume.

4. A turbomachine intermediate casing comprising a plurality of discharge valves according to claim 1 ensuring sealing at the level of a plurality of air passage orifices.

5. The turbomachine comprising a low-pressure compressor a high-pressure compressor and an intermediate casing according to claim 4 positioned longitudinally between the low-pressure compressor and the high-pressure compressor.

* * * * *